(12) United States Patent
Jung (10) Patent No.: US 12,542,843 B2
(45) Date of Patent: Feb. 3, 2026

(54) THEME TOK

(71) Applicant: SLASH B SLASH Co., Ltd, Busan (KR)

(72) Inventor: Yong Chae Jung, Seongnam-si (KR)

(73) Assignee: SLASH B SLASH CO., LTD (KR)

( * ) Notice: Subject to any disclaimer, the term of this patent is extended or adjusted under 35 U.S.C. 154(b) by 295 days.

(21) Appl. No.: 18/495,740

(22) Filed: Oct. 26, 2023

(65) Prior Publication Data
US 2025/0063113 A1    Feb. 20, 2025

(30) Foreign Application Priority Data
Aug. 18, 2023   (KR) .......................... 10-2023-0108511

(51) Int. Cl.
*H04M 1/02*    (2006.01)
*H04B 5/72*    (2024.01)

(52) U.S. Cl.
CPC ............ *H04M 1/0283* (2013.01); *H04B 5/72* (2024.01)

(58) Field of Classification Search
CPC ............................... H04M 1/0283; H04B 5/72
See application file for complete search history.

(56) References Cited

U.S. PATENT DOCUMENTS

| | | | | |
|---|---|---|---|---|
| 9,806,421 B1* | 10/2017 | Pajona | ................... | H01Q 1/243 |
| 2015/0245384 A1* | 8/2015 | Nambord | ................... | H04B 5/26 |
| | | | | 455/41.1 |
| 2016/0349790 A1* | 12/2016 | Connor | ................... | G06F 3/017 |
| 2019/0140682 A1* | 5/2019 | Barnett | ................ | H04B 1/3877 |
| 2019/0215391 A1* | 7/2019 | Chiang | ................... | F16M 13/00 |
| 2021/0358619 A1* | 11/2021 | Vu | ......................... | G16H 20/10 |
| 2023/0140707 A1* | 5/2023 | Henning | .............. | H04N 23/663 |
| | | | | 361/679.01 |

FOREIGN PATENT DOCUMENTS

| | | |
|---|---|---|
| KR | 20180046660 A | 5/2018 |
| KR | 20210042002 A | 4/2021 |
| KR | 102388200 B1 | 4/2022 |
| KR | 20220058409 A | 5/2022 |

OTHER PUBLICATIONS

Stray Kids Galaxy Collaboration: Meet SKZOO with SLBS SKZOO NFC Theme Talk. There are so many things I want to do: Naver Blog. (Jul. 13, 2023). https://blog.naver.com/ethereal_hun/223155526578.

* cited by examiner

*Primary Examiner* — David Bilodeau
(74) *Attorney, Agent, or Firm* — Renaissance IP Law Group LLP

(57) ABSTRACT

The present inventive concept provides a Theme Tok. The Theme Tok according to the present inventive concept includes: a decoration unit to which a theme decoration is attached; a grip unit configured of multi-stage folding bellows bodies, one side of which is coupled to the decoration unit; a fixing unit coupled to the other side of the grip unit and attached to a backside of a smartphone; an NFC tag embedded in the fixing unit to perform near-field communication with the smartphone; and a shielding unit embedded in the fixing unit to be disposed on one side of the NFC tag, wherein a unique authentication code of the theme decoration is stored in the NFC tag.

6 Claims, 6 Drawing Sheets

THEME TOK

BACKGROUND

Technical Field

The present inventive concept relates to a Theme Tok, and more specifically, to a Theme Tok, in which when an NFC tag that stores a unique authentication code of a theme decoration is tagged on a smartphone, the smartphone acquires and transmits the unique authentication code to a contents server, and the contents server may confirm whether the unique authentication code is activated, execute contents corresponding to the unique authentication code, and simultaneously prevent malfunction of NFC.

Background of the Related Art

A smartphone is a representative intelligent portable terminal, such as a cellular phone in which a mobile operating system is mounted like a personal computer (PC) so that various applications and contents are allowed to be used.

Meanwhile, NFC is a non-contact short-range wireless communication technique that can exchange data bidirectionally in a band of 13.56 MHz at a distance within 10 cm, and supports both reading and writing unlike RFID. As advancement in the NFC technique is combined with the smartphone, smartphone accessories, which are configured to allow specific contents corresponding to the code of NFC to be executed on the smartphone, are provided in the market.

One of these smartphone accessories is GripTok attached on the backside of the main body of a smartphone so that a user may stably grip the smartphone. The GripTok prevents the smartphone from unintentionally leaving the user's hand and falling onto the floor. However, since the GripTok is attached and fixed to the smartphone and continuously maintains the fixed state, Near Field Communication (NFC) of the smartphone unnecessarily operates even when the user does not desire and generates an unexpected malfunction.

Therefore, it is required to provide a smartphone grip accessory that can prevent NFC recognition malfunction while making it easy to grip or place the smartphone.

SUMMARY

Therefore, the present inventive concept has been made in view of the above problems, and it is an object of the present inventive concept to provide a Theme Tok, in which when an NFC tag that stores a unique authentication code of a theme decoration is tagged on a smartphone, the smartphone acquires and transmits the unique authentication code to a contents server, and the contents server may confirm whether the unique authentication code is activated, execute corresponding contents to the unique authentication code, and simultaneously prevent malfunction of NFC.

To accomplish the above object, according to one aspect of the present inventive concept, there is provided a Theme Tok comprising: a decoration unit to which a theme decoration is attached; a grip unit configured of multi-stage folding bellows bodies, one side of which is coupled to the decoration unit; a fixing unit coupled to the other side of the grip unit and attached to a backside of a smartphone; an NFC tag embedded in the fixing unit to perform near-field communication with the smartphone; and a shielding unit embedded in the fixing unit to be disposed on one side of the NFC tag, wherein a unique authentication code of the theme decoration is stored in the NFC tag.

In an embodiment, when the NFC tag is tagged on the smartphone before the Theme Tok is attached to the smartphone, the smartphone acquires and transmits the unique authentication code to the contents server, and the contents server confirms whether the unique authentication code is activated and executes contents corresponding to the unique authentication code.

In an embodiment, the decoration unit includes: a first coupling end unit coupled to one side of the grip unit; and a decoration surface formed on an opposite side of the first coupling end unit to be exposed to the outside, wherein the theme decoration is attached to the decoration surface, and a picture including a character is formed on the theme decoration.

In an embodiment, the grip unit includes: the multi-stage folding bellows bodies made of an elastic material of synthetic resin; and a connection unit connecting the bellows bodies, wherein the bellows bodies are configured in a multi-stage form in which a diameter gradually increases from end units connected to the connection unit to end units coupled to the decoration unit and the fixing unit.

In an embodiment, the fixing unit includes: a second coupling end unit coupled to the other side of the grip unit; an adhesive surface formed on an opposite side of the second coupling end unit to be attached to the smartphone; and an adhesive unit for bonding the adhesive surface to the smartphone, and one side of the Theme Tok is attached to the backside of the smartphone.

In an embodiment, the shielding unit is disposed between the adhesive unit and the NFC tag, and blocks communication between the NFC tag and the smartphone while the Theme Tok is attached to the backside of the smartphone.

As the Theme Tok according to an embodiment of the present inventive concept accesses the contents server through an application installed in the smartphone, and the contents server activates a unique authentication code of which matching is confirmed, and transmits specific contents stored in a media server to the smartphone based on unique contents information corresponding to the unique authentication code, unique contents corresponding to the unique authentication code of a theme decoration can be executed.

In addition, as the Theme Tok according to an embodiment of the present inventive concept has a shielding unit between the NFC tag and the attachment surface, and thus may prevent malfunction by blocking communication with the smartphone after attaching the Theme Tok to the smartphone when authentication is performed once before attaching the Theme Tok to the smartphone, troubles generated by the malfunction can be eliminated.

In addition, as the Theme Tok according to an embodiment of the present inventive concept is configured such that when an NFC tag is tagged on a smartphone, the smartphone acquires a unique authentication code stored in the NFC tag and transmits the authentication code to the contents server, and the contents server confirms whether the unique authentication code matches the user's smartphone and does not allow access of unmatched third-party smartphones to the contents server, security can be improved.

In addition, the Theme Tok according to an embodiment of the present inventive concept is a design element and may obtain aesthetic effects as a theme decoration having a picture formed to contain a character of various shapes and forms is attached to the decoration surface exposed to the outside in accordance with preferred tastes of consumers.

In addition, as the grip unit is configured of a bellows body made of an elastic material of synthetic resin, of which the diameter gradually increases from the connection unit to the end units coupled to the decoration unit and the fixing unit, and a connection unit connecting the bellows body, in the case of holding the smartphone by inserting index and middle fingers between the grip unit of the Theme Tok, the Theme Tok according to an embodiment of the present inventive concept may alleviate the inconvenience of users with small hands having to hold the smartphone with their index and middle fingers spread excessively, and prevent pains or numbness in the hand caused by applying excessive force to the index and middle fingers so that the grip unit inserted between the index and middle fingers may not fall out.

DETAILED DESCRIPTION OF THE PREFERRED EMBODIMENT

Hereinafter, embodiments of the present inventive concept will be described in detail with reference to the accompanying drawings so that those skilled in the art may easily implement the present inventive concept. The present inventive concept may be implemented in various different forms and is not limited to the embodiments described herein. Parts not related to the description are omitted from the drawings to clearly explain the present inventive concept, and the same reference numerals are given to identical or components similar throughout the specification.

It should be understood that in this specification, terms such as "comprise", "have", and the like are intended to indicate the presence of features, numbers, steps, operations, components, parts, or combinations thereof described in the specification, but are not intended to exclude in advance the possibility of existence or addition of one or more other features, numbers, steps, operations, components, parts, or combinations thereof. In addition, when a part of a layer, membrane, region, plate, or the like is said to be "on" another part, this includes not only the cases where it is "directly above" another part, but also the cases where there is another part in between. Conversely, when a part of a layer, membrane, region, plate, or the like is said to be "under" another part, this includes not only the cases where it is "immediately under" another part, but also the cases where there is another part in between.

Hereinafter, a Theme Tok according to an embodiment of the present inventive concept will be described in more detail with reference to the drawings.

Figure 1:
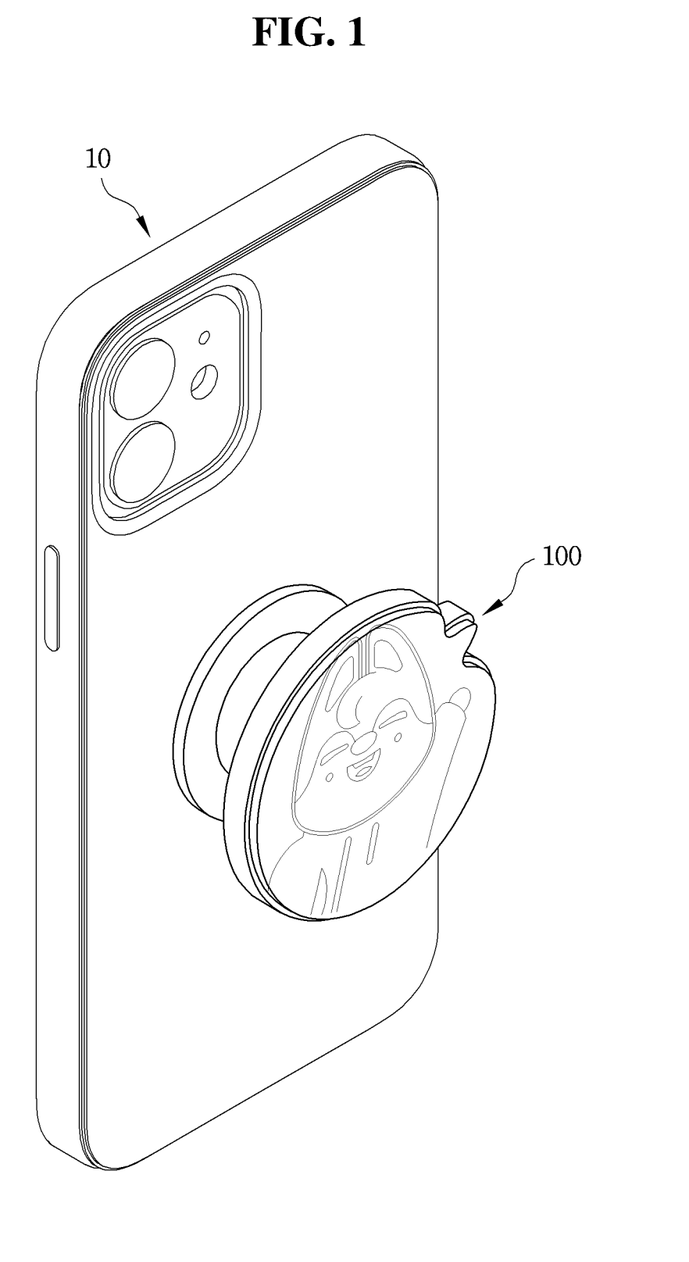
FIG. 1 is a view showing a state in which a Theme Tok is attached to a smartphone according to an embodiment of the present inventive concept.
Figure 2:
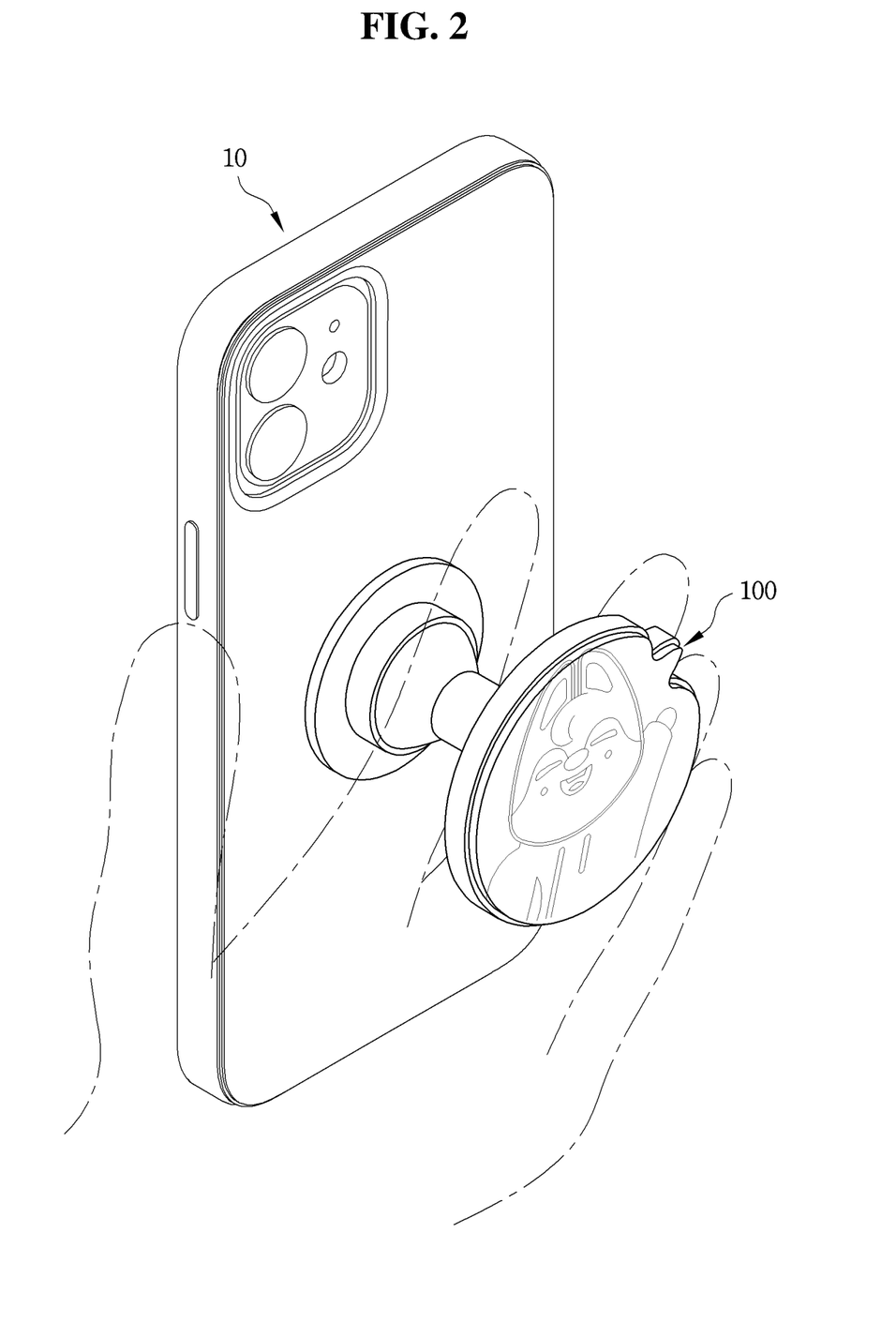
FIG. 2 is an exemplary view showing the use state of a Theme Tok according to an embodiment of the present inventive concept.

FIG. 1 is a view showing a state in which a Theme Tok is attached to a smartphone according to an embodiment of the present inventive concept, and FIG. 2 is an exemplary view showing the use state of a Theme Tok according to an embodiment of the present inventive concept.

Referring to FIGS. 1 and 2, a Theme Tok 100 according to an embodiment of the present inventive concept is a type of smartphone accessory attached to a smartphone 10 or a smartphone case to ensure that a user may easily grip. That is, the Theme Tok 100 is an accessory that allows a user to grip or place a smartphone, and may be configured to be easily attached to the backside of the smartphone 10. At this point, the Theme Tok 100 may include a strap or a smart button that performs a separate input function.

Here, the Theme Tok 100 may be attached to the backside of the smartphone 10, i.e., on the opposite side of the display. As will be described below, the Theme Tok 100 may be pulled out to be extended toward the rear side of the smartphone 10 when it is used so that the user may grip the Theme Tok with fingers. In addition, the Theme Tok 10 may be pulled in and tightly attached to the smartphone 10 when not in use.

Figure 3:
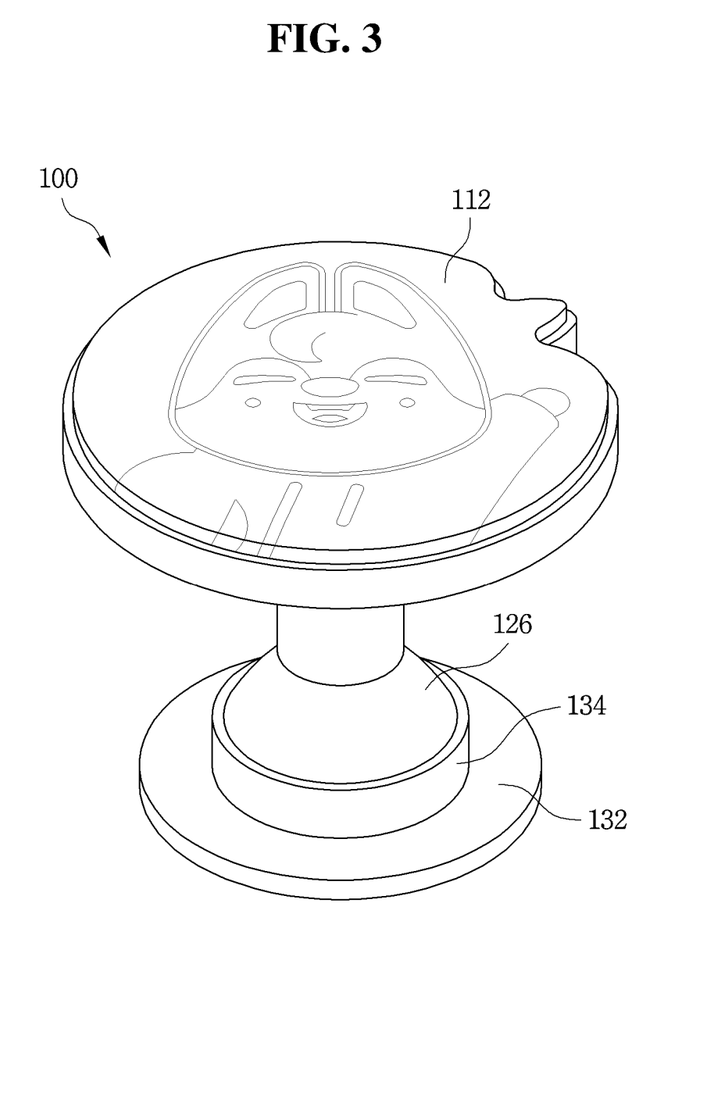
FIG. 3 is a front view showing a Theme Tok according to an embodiment of the present inventive concept.
Figure 4:
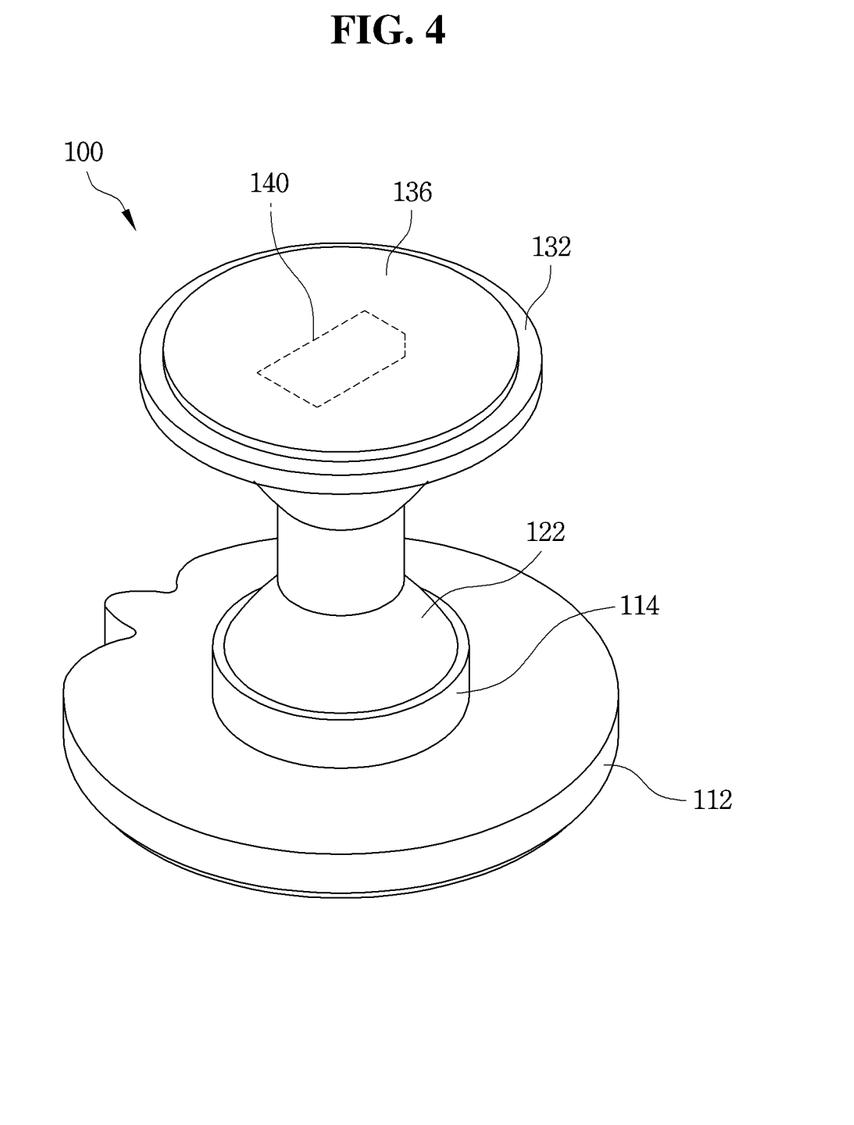
FIG. 4 is a rear view showing a Theme Tok according to an embodiment of the present inventive concept.
Figure 5:
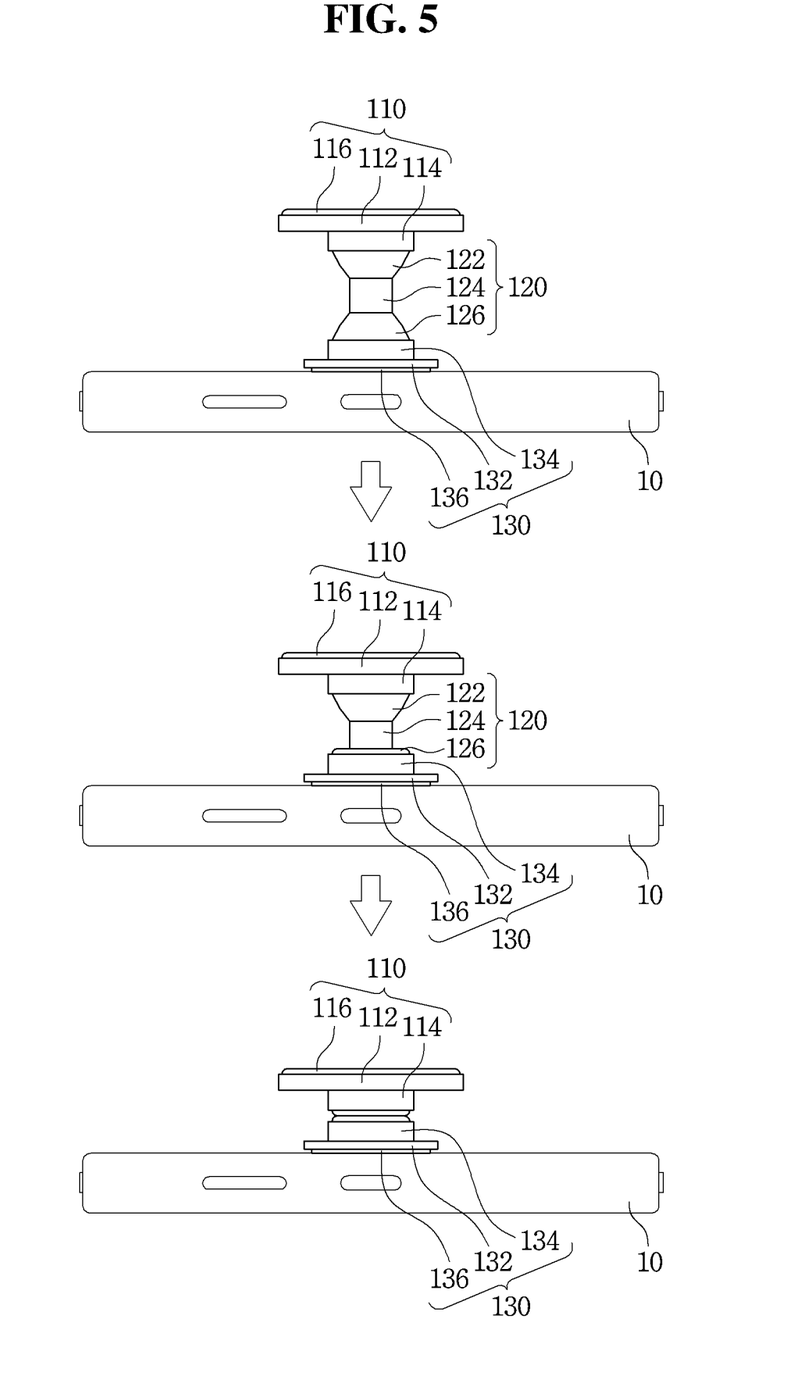
FIG. 5 is a view showing the process of pulling in or pulling out a grip unit of a Theme Tok according to an embodiment of the present inventive concept.

FIG. 3 is a front view showing a Theme Tok according to an embodiment of the present inventive concept, FIG. 4 is a rear view showing a Theme Tok according to an embodiment of the present inventive concept, and FIG. 5 is a view showing the process of pulling in or pulling out a grip unit of a Theme Tok according to an embodiment of the present inventive concept.

Referring to FIGS. 3 to 5, the Theme Tok 100 according to an embodiment of the present inventive concept includes a decoration unit 110, a grip unit 120, a fixing unit 130, and an NFC tag 140.

The decoration unit 110 is for decorating the smart phone with characters or the like, and may include a decoration surface 112, a first coupling end unit 114, and a theme decoration 116.

The decoration surface 112 has a disk-shaped structure and may form a flat surface on the opposite side of the first coupling end unit 114 to be exposed to the outside. At this point, the theme decoration 116 may be attached to one side of the decoration surface 112 exposed to the outside. Specifically, as shown in FIGS. 3 and 5, the decoration surface 112 is formed such that one side is coupled to the first coupling end unit 114 and the theme decoration 116 is attached to the other side, and it is preferable that the decoration surface 112 is formed to have a diameter larger than that of the first coupling end unit 114 to prevent the user's finger inserted into the Theme Tok 100 from being separated by external force or slip.

The first coupling end unit 114 has a cylindrical structure with a space formed inside thereof, and is coupled to one side of the grip unit 120. Specifically, as shown in FIGS. 4 and 5, as the first coupling end unit 114 is formed such that one side is coupled to the decoration surface 112 and the other side is coupled to the first bellows body 122, the first coupling end unit 114 may be configured to connect the decoration surface 112 of the decoration unit 110 and the first bellows body 122 of the grip unit 120.

The theme decoration 116 is a part installed on the flat surface of the decoration surface 112 exposed to the outside, which is a design element manufactured as characters of various shapes and forms in accordance with preferred tastes of consumers. In addition, the theme decoration 116 may be formed to protrude three-dimensionally from the decoration surface 112 to be exposed to the outside, or may have graphics printed two-dimensionally. In addition, the theme decoration 116 may be made of various materials, and may be handmade or repeatedly produced in large quantities through automation facilities. At this point, the theme decoration 116 may be formed as a picture including a character.

As described above, the Theme Tok 100 according to an embodiment of the present inventive concept is a design element and may obtain aesthetic effects as a theme decoration having a picture formed to contain a character of various shapes and forms is attached to the decoration surface exposed to the outside in accordance with preferred tastes of consumers.

The grip unit 120 for a user to hold is made of an elastic material of synthetic resin, and may include multi-stage folding bellows bodies 122 and 126 and a connection unit 124. Here, the bellows bodies 122 and 126 may be configured in a multi-stage form in which the diameter gradually increases from the connection unit 124 to the end units 114 and 134 coupled to the decoration unit 110 and the fixing unit 130.

The first bellows body 122 is made of an elastic material of synthetic resin and may be formed in a multi-stage folding structure. Specifically, as shown in FIGS. 4 and 5, the first bellows body 122 may be compressed or expanded by elasticity. In addition, the first bellows body 122 may be formed such that one side is coupled to the first coupling end unit 114 and the other side is coupled to the connection unit 124. That is, the first bellows body 122 may be configured between the first coupling end unit 114 of the decoration unit 110 and the connection unit 124 of the grip unit 120. At this point, the bellows bodies 122 and 126 are configured so that each stage is folded inward to be pulled out and pulled in, and the number and diameter of the constituent stages may be determined in various ways. In addition, the first bellows body 122 may be configured to gradually increase the diameter toward the first coupling end unit 114 from the connection unit 124 so that the minimum diameter is formed on the connection unit 124 side.

The connection unit 124 has a cylindrical structure with a space formed inside thereof, and may connect the bellows bodies 122 and 126. Specifically, as shown in FIG. 5, as the connection unit 124 is formed such that one side is coupled to the first bellows body 122 and the other side is coupled to the second bellows body 126, the connection unit 124 may connect the first and second bellows bodies 122 and 126. In addition, the connection unit 124 is a part where the user's fingers inserted into the Theme Tok 100 are positioned, and the connection unit 124 is preferably formed to have a minimum diameter so that the user may stably grip the smartphone 10 by inserting the index and middle fingers in the grip unit 120 of the Theme Tok 100 when the user's palm is positioned on the backside of the smartphone 10 while carrying the smartphone 10.

As the second bellows body 126 may be formed such that one side is coupled to the second coupling end unit 134 and the other side is coupled to the connection unit 124, the second bellows body 126 may be configured between the second coupling end unit 134 of the fixing unit 130 and the connection unit 124 of the grip unit 120. At this point, the configuration of the second bellows body 126 is the same as that of the first bellows body 122, detailed description thereof will be omitted.

As described above, as the Theme Tok 100 according to an embodiment of the present inventive concept includes the bellows bodies 122 and 126 made of a material having elasticity and flexibility and configured in a multi-stage form in which the diameter gradually increases from the connection unit 124 to the end units 114 and 134 coupled to the decoration unit 110 and the fixing unit 130, a minimum diameter is formed on the connection unit 124 side, and thus it is easy to hold the smartphone 10, and it is possible to alleviate the inconvenience of users with small hands having to hold the smartphone 10 with their index and middle fingers spread excessively, and prevent pains or numbness in the hand caused by applying excessive force to the index and middle fingers so that the grip unit 120 inserted between the index and middle fingers may not fall out.

The fixing unit 130 is for attaching the Theme Tok 100 to the backside of the smartphone 10, and may include an adhesive surface 132, a second coupling end unit 134, and an adhesive unit 136.

The adhesive surface 132 has a disk-shaped structure and may form a flat surface on the opposite side of the second coupling end unit 134 to be attached to the smartphone. Specifically, as shown in FIGS. 4 and 5, the adhesive surface 132 may be formed such that one side is coupled to the second coupling end unit 134 and the adhesive unit 136 is attached to the other side.

The second coupling end unit 134 has a cylindrical structure with a space formed inside thereof, and may be coupled to the other side of the grip unit 120. Specifically, as shown in FIGS. 3 and 5, as the second coupling end unit 134 is formed such that one side is coupled to the adhesive surface 132 and the other side is coupled to the second bellows body 126, the second coupling end unit 134 may be configured to connect the adhesive surface 132 of the fixing unit 130 and the second bellows body 126 of the grip unit 120.

The adhesive unit 136 is a part attached to the backside of the smartphone 10 and may bond the adhesive surface 132 and the smartphone 10. At this point, the adhesive unit 136 may be applied with an adhesive tape or adhesive that provides adhesive force to be bonded to the backside of the smartphone 10.

The NFC tag 140 is embedded in the fixing unit 130 and may perform near-field communication with the smartphone 10. The NFC tag 140 may store a unique authentication code of the theme decoration 116. At this point, when the NFC tag 140 is tagged on the smartphone 10, the smartphone 10 may acquire the unique authentication code of the NFC tag 140. That is, the Theme Tok 100 may activate the unique authentication code by the NFC tag 140 by tagging the fixing unit 130 to the smartphone 10 before being attached to the smartphone 10.

Figure 6:
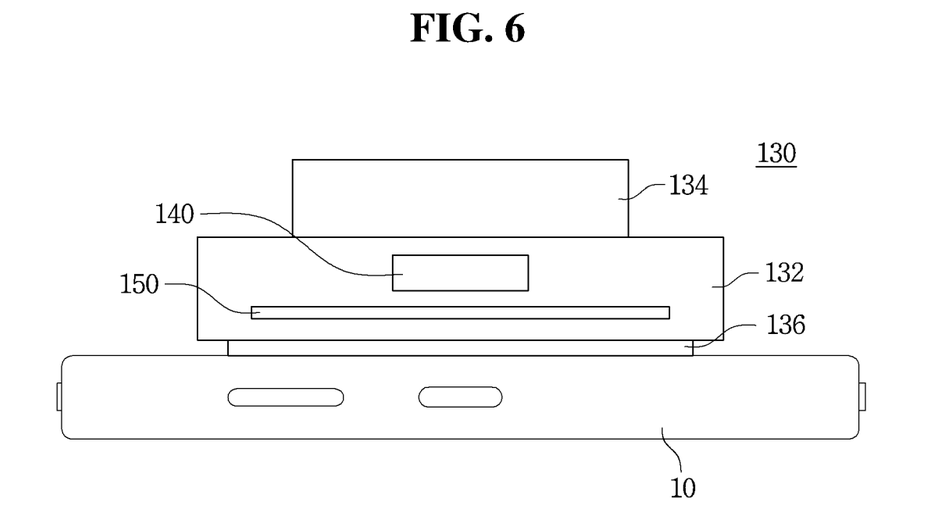
FIG. 6 is a cross-sectional view showing a fixing unit of a Theme Tok according to an embodiment of the present inventive concept.

FIG. 6 is a cross-sectional view showing a fixing unit of a Theme Tok according to an embodiment of the present inventive concept.

Referring to FIG. 6, the Theme Tok 100 may further include a shielding unit 150.

The shielding unit 150 is embedded in the fixing unit 130 and may be disposed on one side of the NFC tag 140. For example, the shielding unit 150 is embedded in the adhesive surface 132 of the fixing unit 130, and may be disposed between one side of the adhesive surface 132 to which the adhesive unit 136 is attached and the NFC tag 140 embedded on one side of the adhesive surface 132 of the fixing unit 130. Accordingly, the shielding unit 150 may block communication between the NFC tag 140 and the smartphone 10 while the Theme Tok 100 is attached to the backside of the smartphone 10. That is, when the Theme Tok 100 is attached to the backside of the smartphone 10, the shielding unit 150 is disposed between the NFC tag 140 and the smartphone 10, and thus communication therebetween can be blocked. For example, the shielding unit 150 may be made of a material that can block or disturb RF signals (radio signals) like a silver foil, shield tape, ferrite, or absorber.

As described above, as the Theme Tok 100 according to an embodiment of the present inventive concept has a shielding unit between the NFC tag and the attachment surface, and thus may prevent malfunction by blocking communication with the smartphone after attaching the Theme Tok 100 to the smartphone 10 when authentication is performed once before attaching the Theme Tok 100 to the smartphone 10, troubles generated by the malfunction can be eliminated.

Hereinafter, a service in which contents are executed using the Theme Tok 100 according to an embodiment of the present inventive concept will be described with reference to FIG. 7.

Figure 7:
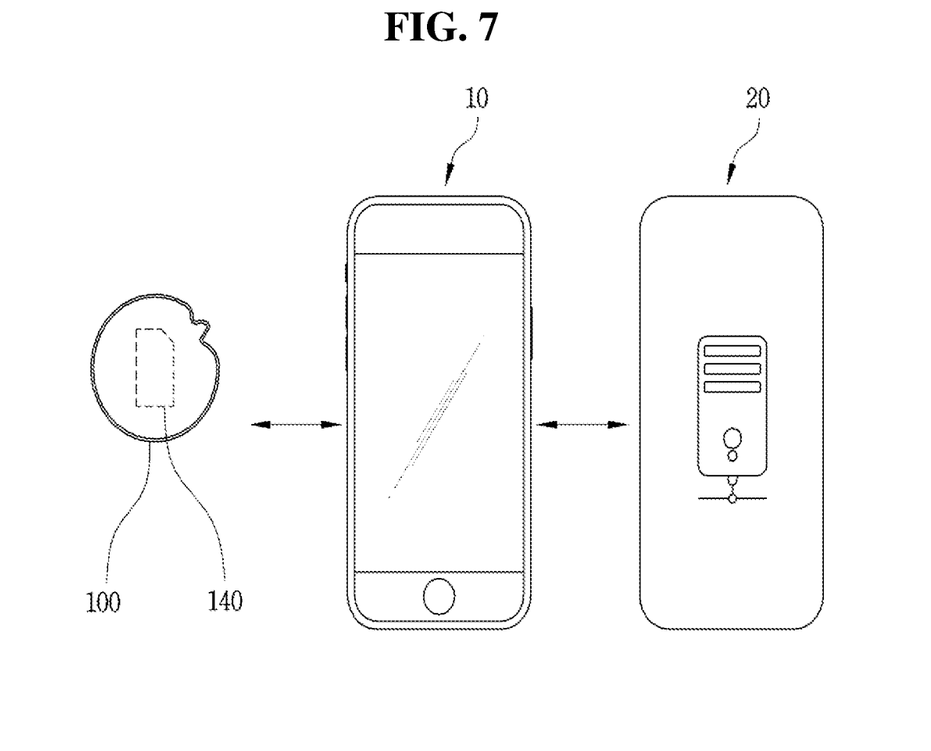
FIG. 7 is a view showing the configuration of service of a Theme Tok according to an embodiment of the present inventive concept.

FIG. 7 is a view showing the configuration of service of a Theme Tok according to an embodiment of the present inventive concept.

Referring to FIG. 7, when the NFC tag is tagged while the fixing unit 130 faces the smartphone 10 before the Theme Tok 100 is attached to the smartphone 10, the smartphone 10 may acquire a unique authentication code stored in the NFC tag 140. Here, the unique authentication code is a code for matching the Theme Tok 100 purchased by the user and the smartphone 10 used by the user. It may be configured to activate the unique authentication code when the NFC tag 140 is tagged on the smartphone 10 before the Theme Tok 100 is attached to the smartphone 10 although the unique authentication code is deactivated in normal times.

Meanwhile, an application for executing unique contents corresponding to the unique authentication code of the NFC tag 140 may be installed in the smartphone 10. When a user tags the Theme Tok 100 on the smartphone 10, the NFC reader of the smartphone 10 may acquire an already activated unique authentication code from the NFC tag 140.

Thereafter, the smartphone 10 may transmit the acquired unique authentication code to the contents server 20. At this point, the contents server 20 may confirm whether the received unique authentication code is activated and transmit contents corresponding to the unique authentication code to the smartphone 10.

As described above, the Theme Tok 100 according to an embodiment of the present inventive concept is configured such that when a third party other than the user mounts the Theme Tok 100 purchased by the user on his or her smartphone 10, the contents server 20 does not allow the smartphone 10 to access the contents server 20 as the activated unique authentication code does not match the smartphone 10 of third party, and through this, security problems that may not be implemented in the conventional NFC method can be solved, and at the same time, unique contents corresponding to the unique authentication code stored in Theme Tok 100 can be executed.

Although an embodiment of the present inventive concept has been described above, the spirit of the present inventive concept is not limited to the embodiment presented in this specification, and although those skilled in the art may easily suggest other embodiments by reinforcing, changing, deleting, or adding constitutional components within the scope of the same spirit, it may also be said that this falls within the scope of the present inventive concept.

DESCRIPTION OF SYMBOLS

| | |
|---|---|
| 10: Smartphone | 110: Decoration unit |
| 20: Contents server | 114: First coupling end unit |
| 100: Theme Talk | 122: First bellows body |
| 112: Decoration surface | 126: Second bellows body |
| 116: Theme decoration | 132: Adhesive surface |
| 120: Grip unit | 150: Shielding unit |
| 124: Connection unit | |
| 130: Fixing unit | |
| 134: Second coupling end unit | |
| 136: Adhesive unit | |
| 140: NFC tag | |

What is claimed is:

1. A Theme Tok comprising:
   a decoration unit to which a theme decoration is attached;
   a grip unit configured of multi-stage folding bellows bodies, one side of which is coupled to the decoration unit;
   a fixing unit coupled to the other side of the grip unit and attached to a backside of a smartphone;
   an NFC tag embedded in the fixing unit to perform near-field communication with the smartphone; and
   a shielding unit embedded in the fixing unit to be disposed on one side of the NFC tag, wherein
   a unique authentication code of the theme decoration is stored in the NFC tag.

2. The Theme Tok according to claim 1, wherein when the NFC tag is tagged on the smartphone before the Theme Tok is attached to the smartphone, the smartphone acquires and transmits the unique authentication code to the contents server, and the contents server confirms whether the unique authentication code is activated and executes contents corresponding to the unique authentication code.

3. The Theme Tok according to claim 1, wherein the decoration unit includes:
   a first coupling end unit coupled to one side of the grip unit; and
   a decoration surface formed on an opposite side of the first coupling end unit to be exposed to the outside, wherein the theme decoration is attached to the decoration surface, and a picture including a character is formed on the theme decoration.

4. The Theme Tok according to claim 1, wherein the grip unit includes:
   the multi-stage folding bellows bodies made of an elastic material of synthetic resin; and
   a connection unit connecting the bellows bodies, wherein the bellows bodies are configured in a multi-stage form in which a diameter gradually increases from the connection unit to the end units coupled to the decoration unit and the fixing unit.

5. The Theme Tok according to claim 1, wherein the fixing unit includes:
   a second coupling end unit coupled to the other side of the grip unit;
   an adhesive surface formed on an opposite side of the second coupling end unit to be attached to the smartphone; and
   an adhesive unit for bonding the adhesive surface to the smartphone, and
   one side of the Theme Tok is attached to the backside of the smartphone.

6. The Theme Tok according to claim 5, wherein the shielding unit is disposed between the adhesive unit and the NFC tag, and blocks communication between the NFC tag and the smartphone while the Theme Tok is attached to the backside of the smartphone.

* * * * *